May 24, 1960

D. W. MURPHY 2,937,899

SYNCHRONOUSLY OPERATED EJECTOR GUNS FOR TRANSLATING
A STORE AWAY FROM AN AIRBORNE VEHICLE

Filed March 8, 1956

DAVID W. MURPHY,
INVENTOR.

SMYTH & ROSTON,
ATTORNEYS.

BY

United States Patent Office 2,937,899
Patented May 24, 1960

2,937,899

SYNCHRONOUSLY OPERATED EJECTOR GUNS FOR TRANSLATING A STORE AWAY FROM AN AIRBORNE VEHICLE

David W. Murphy, Torrance, Calif., assignor to Pastushin Aviation Corporation, Los Angeles, Calif., a corporation Filed Mar. 8, 1956, Ser. No. 570,299

17 Claims. (Cl. 294—83)

This invention relates to means for mounting a jettisonable store, such as an auxiliary fuel tank, on an airborne vehicle in a releasable manner and for applying ejection force to the released store to thrust the store away from the aircraft.

The invention is particularly directed to the problem of causing the whole length of the store to be thrust away from the airborne vehicle uniformly, the store being translated with substantially no longitudinal turning movement. With the speeds of flight of airborne vehicles commonly in the supersonic range, it has become highly desirable, if not mandatory, that stores, especially relatively large stores, be ejected with exceedingly high acceleration and without the application of any appreciable longitudinal turning moment.

It has been a practice in the past to use a single pressure-actuated ejector gun to thrust a jettisonable auxiliary fuel tank away from an aircraft. One disadvantage of such a practice is that the application of force at a single point of sufficient magnitude for the desired acceleration may result in indentation if not rupture of the store, instead of high acceleration. Another disadvantage is that pure translation of the store can be achieved in this manner only if the single thrust is properly related to the center of gravity of the store. In the absence of an extraneous factor, the thrust must be aligned precisely with the center of gravity. If the thrust is out of alignment with the center of gravity, even to a minor degree, the store is ejected with a longitudinal turning moment.

To achieve high ejection acceleration and to minimize the possibility of a longitudinal turning moment, it is desirable to use two ejector guns spaced apart longitudinally of the store, especially when the store is relatively long. The problem, however, is to use two such longitudinally spaced ejector guns in such manner as to eject the store with a motion that is substantially pure translation. A basic difficulty is that the two ejection guns are practically always at different distances from the center of gravity of the store, and, of course, inertia of greater magnitude must be overcome by the gun that is nearest the center of gravity. If the two ejector guns exert equal thrust forces, the gun nearest the center of gravity will necessarily operate less rapidly than the other ejector gun with the consequence that the store will be ejected with a drastic longitudinal turning moment.

The invention solves this problem by using two separate bodies of compressed gaseous fluid to actuate the two guns and by selecting the volumes and pressures of these gaseous bodies as well as the diameters of the two ejector gun pistons so that the ratio between the two thrust forces is in accord with the different distances from the center of gravity, the greater force being exerted at the ejector gun nearest the center of gravity.

Another difficulty is that extraneous aerodynamic forces incidental to normal flight of the aircraft impose a longitudinal turning moment on the released store, especially since the normal attitude of the store at the moment of release is at some angle of attack relative to the air stream. The invention meets this second difficulty by suitable compensation for this aerodynamic turning moment. Thus the ratio between the two thrust forces exerted by the two ejector guns is selected in accord with the inverse ratio of the two distances from the center of gravity, but this ratio is modified to allow for the effect of the extraneous aerodynamic moment.

In one form of the invention, explosive material is detonated in a combustion chamber to generate the required high pressure actuating fluid. With a suitable time lag after the detonation, both of the ejector guns are cut off from the combustion chamber to isolate two corresponding high pressure gaseous bodies and then the usual attachment means that normally holds the store on the airborne vehicle is mechanically released. Mechanically releasing the store results in adiabatic expansion of the two gaseous bodies and the store is thereby thrust away from the airborne vehicle with pure translation.

In the preferred practice of the invention, both the cut-off means and the means to release the attachment means are responsive to the rise in pressure of the generated gas. A further feature is that mechanical release of the attachment means can occur only if both ejector guns are operative.

In a second form of the invention, a reservoir that is charged with highly compressed gaseous fluid is normally in communication with the two ejector guns to maintain high-pressure gaseous bodies therein. Release of the attachment means that holds the store on the airborne vehicle results in adiabatic expansion of the two confined gaseous bodies. In the preferred practice of this form of the invention, fluid-pressure-actuated means unlatches the store, the fluid-pressure-actuated means being energized from the same high pressure reservoir under control of a suitable solenoid valve.

A further feature of this second practice of the invention is that the high pressure reservoir is in communication with the two ejector guns through two corresponding orifices of relatively small diameter. When the store is mechanically released from the airborne vehicle to permit the fluid-pressure-actuated ejection to occur, these orifices, in effect, isolate the gaseous bodies in the two ejector guns during the adiabatic expansion of the gaseous bodies. Thus the two orifices eliminate the necessity for a cut-off valve.

The several features and advantages of the invention may be understood from the following detailed description considered with the accompanying drawings.

In the drawings, which are to be regarded as merely illustrative:

Figure 18 is an end elevation of the forward ejector gun as viewed from the left in Figure 1;

Figure 19 is a fragmentary section taken as indicated by the line 19—19 of Figure 18 showing an adjustable lost-motion mechanism that is incorporated in the forward ejector gun unit;

*General arrangement*

Figure 1:
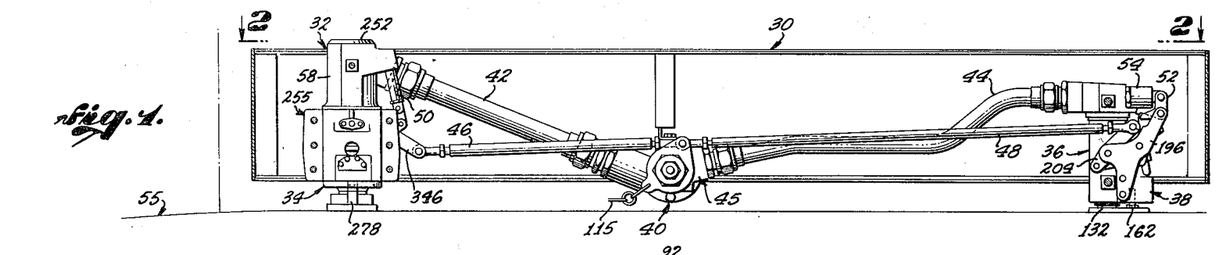
Figure 1 is a side elevation of a selected embodiment of the invention in which a combustion chamber is connected to two spaced ejector guns through a rotary valve.
Figure 2:
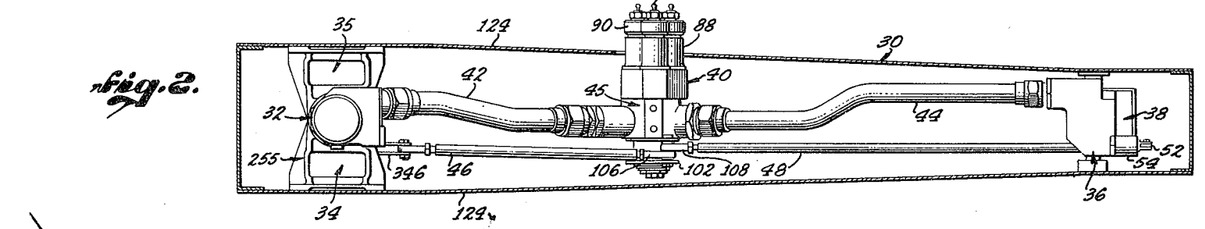
Figure 2 is a plan view of the same apparatus.

Figures 1 and 2 show a hollow structure, generally designated 30, in which the first embodiment of the invention is mounted, which hollow structure may be, for example, a wing of an airborne vehicle or a pylon that is mounted on the wing or body of the vehicle. The principal parts of the first embodiment of the invention include: a forward ejector gun unit comprising a forward ejector gun 32 and two jaw assemblies 34 and 35 on opposite sides of the ejector gun to releasably attach a store to the aircraft; an aft ejector gun unit comprising an aft ejector gun 36 and a third single jaw assembly 38 associated therewith; a breech or combustion chamber, generally designated 40, for the detonation of explosive material therein to generate high pressure gaseous fluid for actuating the ejector guns and jaw assemblies; a pipe 42 for transmitting the generated gases from the combustion chamber 40 to the forward ejector gun 32; a pipe 44 for conducting the generated gases to the aft ejector gun 36; a rotary valve, generally designated 45, controlling the flow of fluid from the combustion chamber into the two pipes 42 and 44; a forward operating rod 46 operatively connecting the rotary valve 45 with the two forward jaw assemblies 34 and 35; an aft operating rod 48 operatively connecting the rotary valve 45 with the aft jaw assembly 38; a small auxiliary power cylinder 50 associated with the forward ejector gun 32 for actuating the rotary valve together with the jaw assemblies; latch means including a pawl 52 in the form of a bell crank that normally prevents actuation of the rotary valve and the jaw assemblies; and a small auxiliary power cylinder 54 associated with the aft ejector gun 36 for release actuation of the bell crank pawl 52. The jaw assemblies 34, 35 and 38 constitute attachment means to releasably hold a jettisonable store, which store may be, for example, a relatively large auxiliary fuel tank 55.

Figure 3:
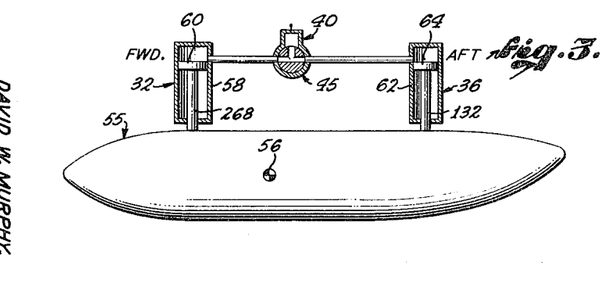
Figure 3 is a diagrammatic view, partly in section, showing the relation of the two ejector guns to the center of gravity of the store.

As shown diagrammatically in Figure 3, the forward ejector gun 32 is relatively close to the center of gravity 56 of the store 55, the aft ejector gun 36 being positioned at a greater distance from the center of gravity. Also as shown diagrammatically in Figure 3, the rotary valve 45 has a normal position that places the combustion chamber 40 in communication with both of the two ejector guns 32 and 36. Since the forward ejector gun 32 is relatively close to the center of gravity of the store, the volume of the initial fluid-confining space of the forward ejector gun including the volume provided by the forward pipe 42 is substantially larger than the volume of the initial fluid-confining space of the aft gun 36 including the volume provided by the aft pipe 44. The diameter of the cylinder or barrel 58 and the associated movable wall or piston 60 of the forward ejector gun 32 is also larger than the diameter of the cylinder or barrel 62 and the associated movable wall or piston 64 of the aft ejector gun 36.

Detonation of the explosive material in the combustion chamber 40 generates high pressure gas which immediately flows through the valve 45 and the two pipes 42 and 44 to the forward and aft ejector guns respectively. Immediately after such flow occurs the valve 45 is rotated to cut off the two ejector guns from each other as well as from the combustion chamber 40. Preferably the rotary valve also at this time vents the combustion chamber for release of residual gases therefrom to the atmosphere. After the rotary valve 45 isolates both of the ejector guns 32 and 36, the various jaw assemblies 34, 35 and 38 are actuated for mechanical release of the store 55, whereupon the two confined gaseous bodies in the two ejector guns, respectively, expand adiabatically for actuation of the two pistons 60 and 64, respectively, to thrust the store away from the aircraft.

The initial volumetric capacity of the two ejector guns 32 and 36 as well as the diameters of their barrels and pistons are selected to cause synchronous movement of the two pistons 60 and 64 thereby to cause the displacement of the store 55 to be substantially pure translation with the store maintaining its initial orientation relative to the aircraft. For this purpose, the character of the adiabatic expansion of the two gaseous bodies confined in the two ejector guns, respectively, must be such as to maintain a constant ratio between the forces of thrust of the two ejector guns throughout the respective strokes of the two pistons 60 and 64. This fact is illustrated by the graph in Figure 4 in which the forces exerted by the two ejector guns 32 and 34 are plotted for the length of the stroke of the two pistons.

Figure 4:
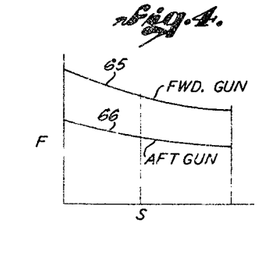
Figure 4 is a graph showing the relation between the thrust pressures exerted by the two guns at different points in their thrust strokes.
Figure 5:
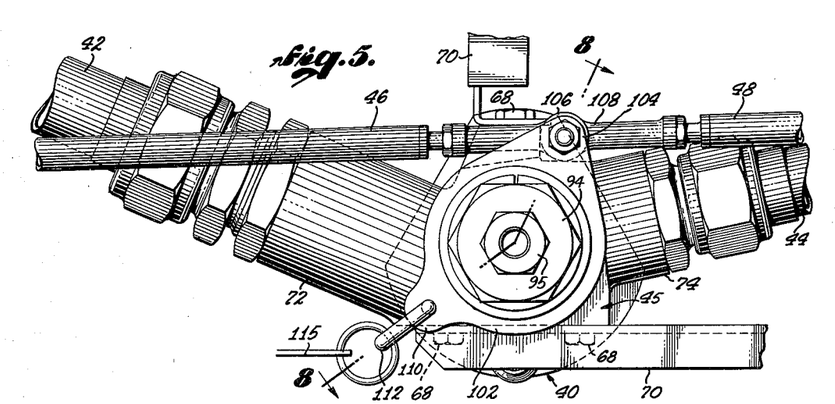
Figure 5 is a greatly enlarged front elevation of the rotary valve shown in Figures 1 and 2.

The ratio between the force exerted by the forward ejector gun 32, as represented by the curve 65 in Figure 4, and the force exerted by the aft ejector gun 36, as represented by the curve 66, is constant throughout the stroke. In the absence of any extraneous factors, this ratio would be the inverse ratio of the relative horizontal distances of the two ejector guns from the center of gravity of the store. Inasmuch as the released store is subjected to an extraneous aerodynamic longitudinal turning moment, however, the ratio represented by the two curves 65 and 66 departs from the inverse ratio of the distances from the center of gravity. The departure from the inverse ratio compensates for the extraneous aerodynamic moment and results in substantially pure translation of the store from the aircraft.

When the explosive material in the combustion chamber 40 is ignited to generate the high pressure gas, the resultant rise in pressure in the forward auxiliary power cylinder 50 tends to cause actuation of the rotary valve together with the jaw assemblies but the angular pawl 52 prevents such actuation until the pressure in the aft gun 36 approaches peak pressure. When the bell crank pawl 52 is actuated, the power cylinder 50 is permitted to operate the rotary valve 45 and the jaw assemblies 34, 35 and 38. By virtue of a lost-motion connection there is a time lag before the jaw asemblies operate to release the store 55. Thus the valve 45 and the various jaw assemblies operate in response to the rise in pressure of the generated gases.

Construction of the breech and rotary valve

Figures 6, 7, 8:
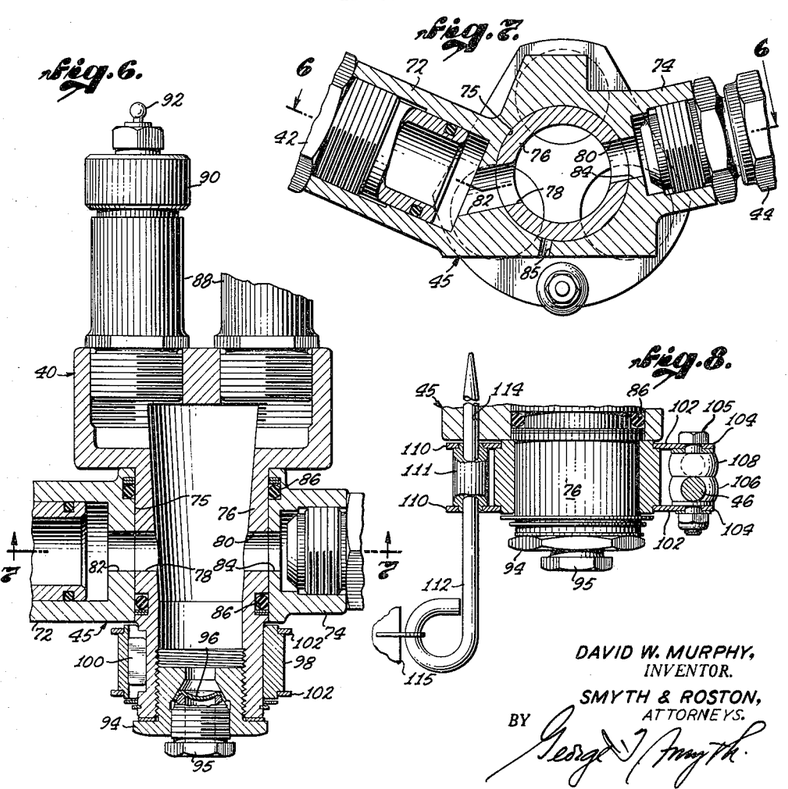
Figure 6 is a cross-sectional view of the same valve taken as indicated by the line 6—6 of Figure 7.
Figure 7 is a transverse section taken as indicated by the line 7—7 of Figure 6.
Figure 8 is a section taken as indicated by the line 8—8 of Figure 5.

The details of construction of the combustion chamber 40 and the rotary valve 45 are shown in Figures 5 to 8. The body of the rotary valve 45 is attached by suitable screws 68 to two support members 70 incorporated in the hollow structure 30. The body of the rotary valve 45 has two diametrically opposite tubular extensions 72 and 74 which are connected by suitable fittings with the two previously mentioned pipes 42 and 44 respectively. As shown in Figures 6 and 7, the body of the rotary valve has an axial bore 75 to journal a rotary plug-type valve member 76. At the normal position of the valve member 76 shown in Figures 6 and 7, two diametrical ports 78 and 80 in the hollow valve member 76 register with two corresponding diametrical ports 82 and 84 in the body of the rotary valve, the latter ports communicating respectively with the pipes 42 and 44. In addition, the valve body 45 has a third radial port 85 for venting gases to the atmosphere, as will be explained.

The hollow valve member 76 is sealed in the axial bore 75 of the valve body by suitable O-rings 86. One end of the hollow valve member 76 has an enlargement which constitutes the previously mentioned combustion chamber 40. Threaded into this enlargement are cylindrical elements 88 to house corresponding cartridges (not shown) of a well known type containing explosive material for generating the required high pressure gas. Each of the cylindrical elements 88 has a cap 90 that is removable for access to its interior and each of the removable caps is provided with a well known type of electrical detonator 92 that is adapted for connection to the usual firing circuit for detonating the cartridges. It is apparent that the gas generated by the detonation of the explosive material will pass through the hollow valve member 76 into the two pipes 42 and 48 to flow to the two ejector guns 32 and 36.

The second end of the hollow valve member 76 is closed by an assembly comprising: a first bushing 94, a second bushing 95, and a frangible disc 96 that is clamped in sealing position by the two bushings. The frangible disc 96 is of a strength to withstand the normal cycle of fluid pressures involved in the operation of the two ejector guns, but is of a strength to burst in the event the fluid pressure approaches a magnitude that might result in damage to the apparatus and to the aircraft on which the apparatus is mounted.

This second end of the valve member 76 is adapted for mechanical actuation and for this purpose has an operating collar 98 mounted thereon with a key 100 to fix the collar against rotation relative to the valve member. Fixedly secured to the operating collar 98 is a spaced pair of sheet metal rings 102 for operative connection to the two operating rods 44 and 46. In the construction shown, the two sheet metal rings 102 form a pair of spaced ears 104 (Figure 8) to receive a suitable pivot bolt 105 and this pivot bolt passes through a clevis 106 on the end of the previously mentioned operating rod 46 and a second clevis 108 on the end of the second operating rod 48.

Preferably, the two sheet metal rings 102 are also formed with a second pair of ears 110 and an interconnecting bushing 111 to receive a safety pin 112. The safety pin 112 extends into a bore 114 of the body of the rotary valve to immobilize the valve member 76 and thereby immobilize the jaw assemblies 34, 35 and 38 while the aircraft is on the ground. A red tape or ribbon 115 may be attached to the safety pin 112 for convenient manual withdrawal of the safety pin to free the apparatus for operation.

It is apparent that rotation of the valve member 76 from its normal position clockwise as shown in Figure 7 will first cut off the two pipes 42 and 44 from the combustion chamber 40 and thus isolate the two pipes from each other. It is also apparent that continued rotation will bring the port 80 of the valve member into register with the vent port 85 to release residual gas from the combustion chamber 40 to the atmosphere.

Construction of the aft ejector gun unit

The construction of the aft ejector gun unit is shown in Figures 9 to 14 inclusive. In the construction shown, an upright cylinder block 120 which forms the previously mentioned cylinder 62 is mounted by cap screws 122 (Figure 11) on a pair of spaced support webs 124. The upper end of the cylinder block 120 forms what may be termed a hollow cylinder head 125 in communication with the upper end of the cylinder 62.

In some practices of the invention, the gaseous fluid for actuating the two ejector guns is generated by the combustion of explosive material while, as heretofore stated, in other practices of the invention, the gaseous fluid is stored under static pressure in a suitable reservoir. The diameter of the cylinder or barrel of the ejector gun differs for these two practices, the larger cylinder diameter being required when the ejector gun is actuated by fluid stored in a reservoir.

Figure 9:
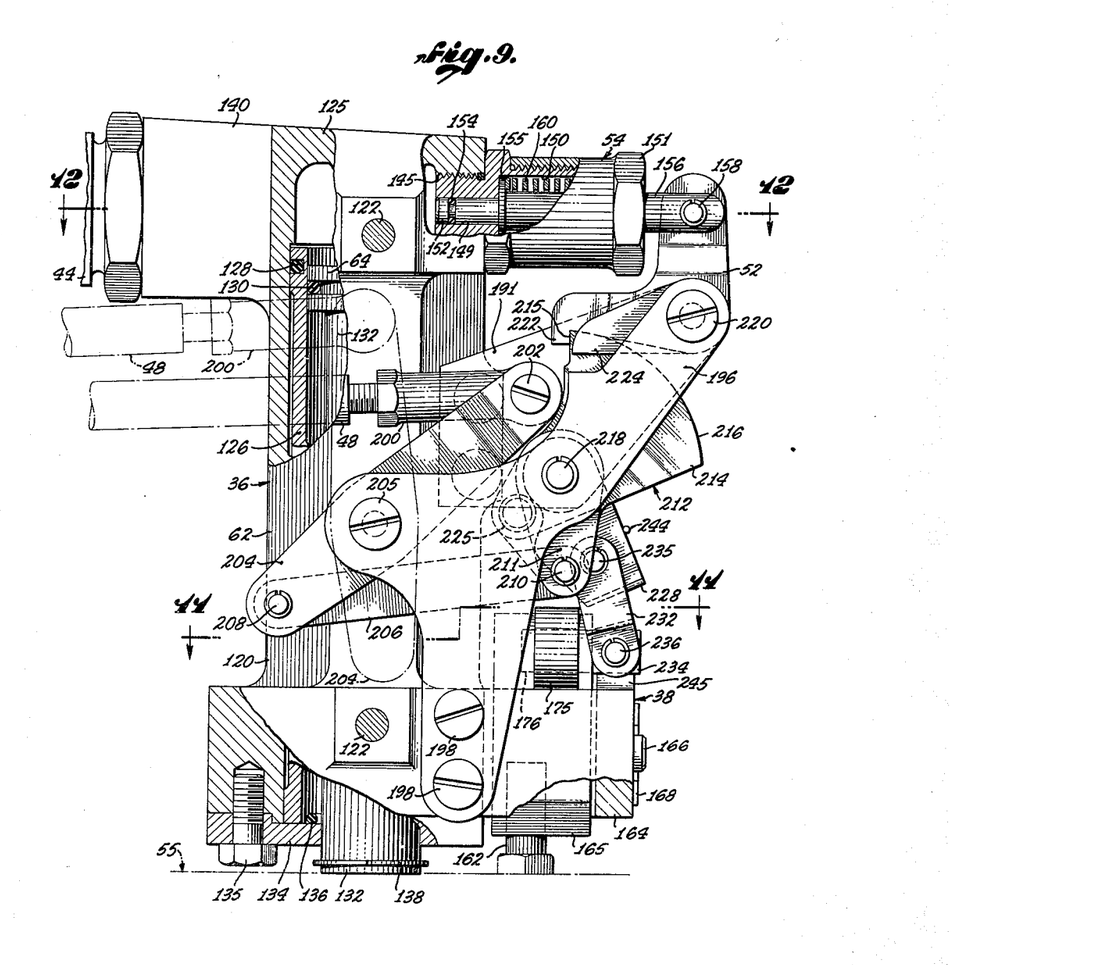
Figure 9 is a side elevational view of the aft ejector gun unit of Figure 1 with portions broken away, the view showing the release mechanism in its latched position.
Figures 10, 11:
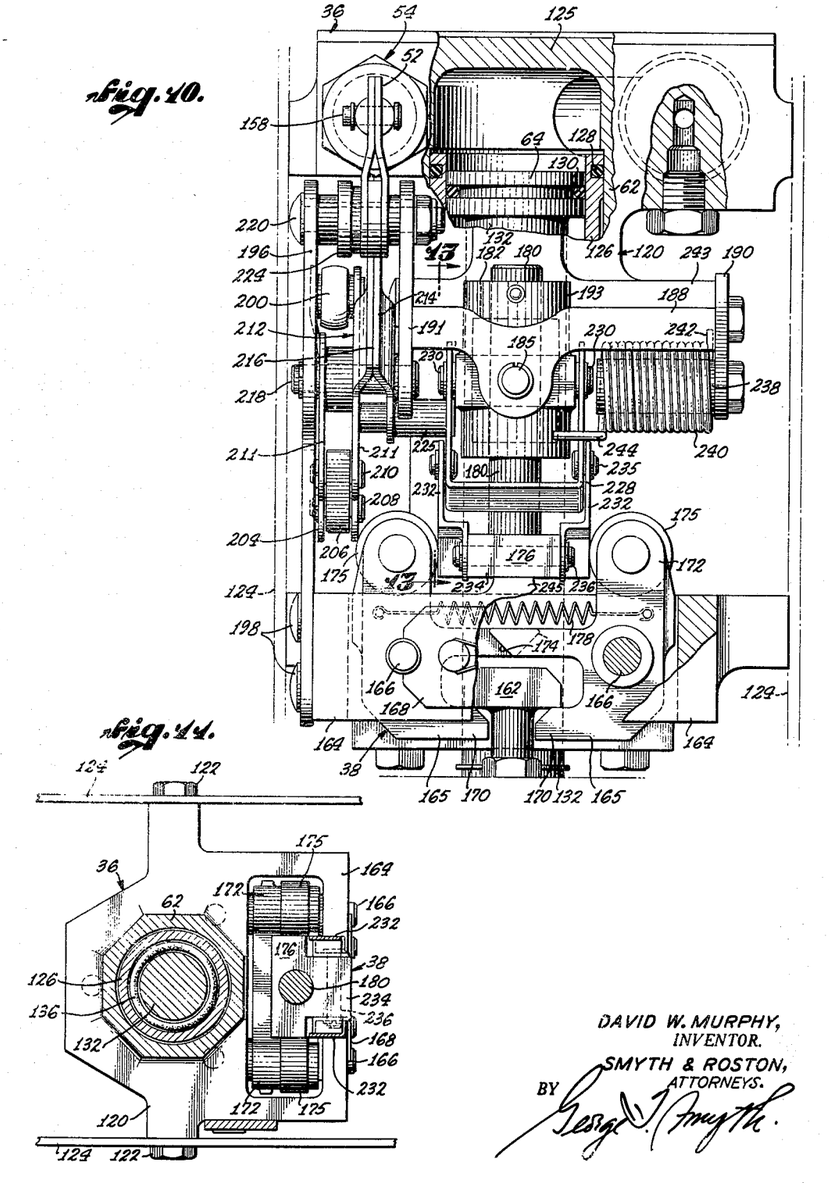
Figure 10 is a similar side elevational view taken at 90° from Figure 9.
Figure 11 is a transverse section taken as indicated by the line 11—11 of Figure 9.

A feature of the present embodiment of the invention is that the cylinder block 120 may be used for either of these two practices of the invention. To provide the two different cylinder diameters, a liner sleeve 126 is provided that fits into the cylinders 62 as shown in Figures 9 and 10, this liner sleeve being provided with suitable O-rings 128 at its upper and lower end. The inner diameter of the liner sleeve 126 is the diameter required when the gaseous fluid is generated by the detonation of explosive material, the liner being removed if the ejector gun is to be actuated by fluid from a high pressure reservoir. In the practice of the invention now being described, explosive material is used to generate the gas and therefore the liner sleeve 126 is employed.

The piston 64 that is slidingly mounted in the liner sleeve 126 is provided with the usual O-ring 130 and is integral with a downwardly extending piston rod 132 that is normally in abutment against the fuel tank 55 for exerting ejection force against the fuel tank. The piston rod 132 extends through a stop ring 134 that is mounted on the lower end of the cylinder block by suitable cap screws 135. An O-ring 136 of rubber-like material may rest on the inner face of this stop ring to serve as a resilient cushion for the piston, the piston moving against this O-ring at its lower limit position. Preferably, the lower end of the piston rod 132 is circumferentially grooved to receive a split ring 138 (Figure 9) which cooperates with the under side of the stop ring 134 to limit the upward movement of the piston.

Figure 12:
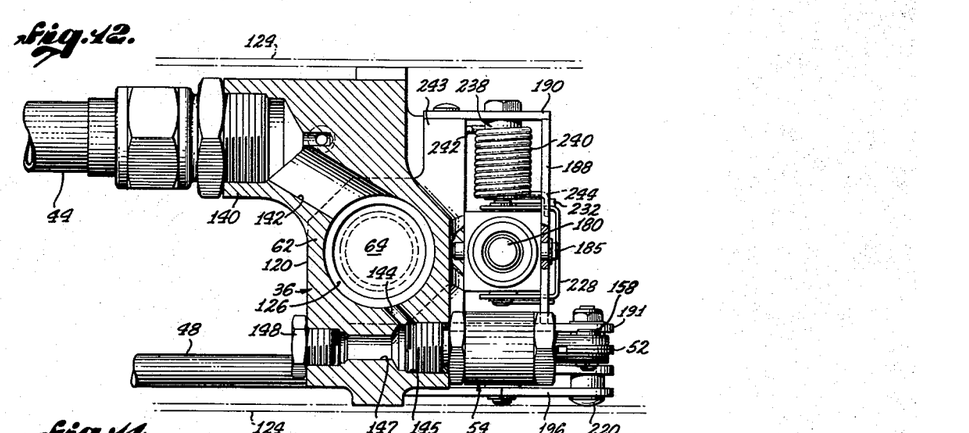
Figure 12 is a transverse section of the aft ejector gun unit of Figure 1 taken as indicated by the line 12—12 of Figure 9.

The hollow cylinder head 125 has a tubular extension 140 for connection to the previously mentioned aft pipe 44 and is provided with a fluid passage 142, as shown in Figure 12, to place the interior of the cylinder 62 in communication with this pipe. A second smaller fluid passage 144 places the interior of the cylinder 62 in communication with a threaded bore 145 in the cylinder head, the auxiliary power cylinder 54 being mounted in this threaded bore. A bore 147 which is an extension of the threaded bore 145 is shown as closed at its outer end by a plug 148.

As best shown in Figure 9, the auxiliary power cylinder 54 has a relatively small inner bore 149 and a larger outer bore 150, the outer end of the cylinder being closed by a cylindrical threaded cap 151. Slidingly mounted in the auxiliary power cylinder 54 is a small piston 152 provided with an O-ring 154. This small piston 152 has a radial flange 155 in the larger outer bore 150 and has an axial extension 156 that extends through the cap 151. The outer end of this extension 156 is forked to receive the upper arm of the bell crank pawl 52 and is connected to the pawl by a suitable pivot member 158. A suitable coil spring 160 inside the auxiliary power cylinder 54 acts in compression between the radial flange 155 and the end wall of the cylinder cap 151 to oppose the outward movement of the small auxiliary piston 152. This spring determines the point in the pressure rise of the combustion gases at which the small piston 152 responds.

The purpose of the jaw assembly 38 of the aft ejector gun unit is to releasably engage a T-shaped shackle 162 of the store or disposable fuel tank 55 as best shown in Figure 10. In this regard a feature of this particular embodiment of the invention is that the aft jaw assembly 38 engages the T-shaped shackle 162 from opposite lateral directions to prevent lateral movement of the fuel tank relative to the aircraft, whereas the two forward jaw assemblies 34 and 35 that are part of the forward ejector gun unit embrace similar T-shaped shackles from opposite longitudinal directions to anchor the store against longitudinal movement relative to the aircraft. Thus the plurality of jaw assemblies effectively immobilize the store against both lateral and longitudinal movement relative to the aircraft. In addition, sway braces (not shown) may be provided on opposite sides of the jaw assembly 38 in a well known manner to prevent side sway of the store.

For the purpose of incorporating the jaw assembly 38 into the aft ejector gun unit, the cylinder block 120 is formed with a U-shaped extension 164 (Figure 11) at its lower end and a pair of jaw members 165 are mounted on corresponding pivots 166. One end of each pivot 166 is mounted in the cylinder block proper and the other end is mounted in the U-shaped extension 164 of the cylinder block. A small cover plate 168 is suitably mounted to cover the gap between the two angular extensions 164 and thus cooperate with the angular extensions to enclose the jaw members 165.

As best shown in Figure 10, each of the jaw members 165 has a lower arm in the form of a hook-shaped jaw 170, an upper locking arm 172 and an auxiliary finger 174. The two auxiliary fingers 174 overlap. The two jaws are normally closed sufficiently for positive engagement with the head of the T-shaped shackle 162. Preferably the upper ends of the two locking arms 172 are provided with suitable rollers 175. At the normal closed positions of the two jaw members 165, what may be termed a locking block 176 is positioned between the two locking arms 172 in abutment against the rollers 175 to keep the two jaw members from opening. A suitable coil spring 178 interconnects the two locking arms 172 and thus provides a force that continuously urges the two jaw members 165 to their open positions.

Figure 13:
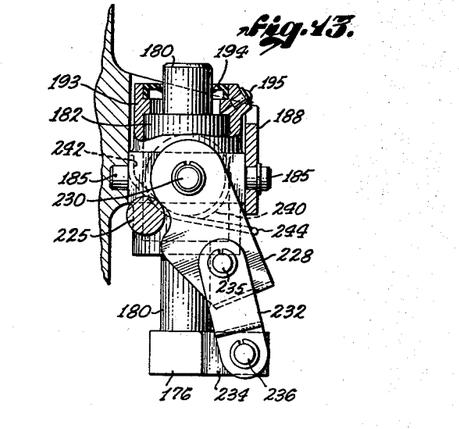
Figure 13 is a fragmentary section taken as indicated by the line 13—13 of Figure 10.

The locking block 176 has an integral upwardly extending shank 180 that is slidingly mounted in a suitable guide block 182, which preferably is a linear ball bushing. The guide block 182 is formed with co-axial trunnions 185, one of which is journalled in the cylinder block 120 and the other of which is journalled in a U-shaped bracket comprising a front plate 188 and two side plates 190 and 191 joined thereto. This U-shaped bracket is mounted on the cylinder block 120 by means of suitable attachment means extending through the two side plates 190 and 191. As best shown in Figure 13 preferably the guide block 182 carries and is enclosed by a casing 193 which carries rubber-like gaskets 194 at its upper and lower ends, respectively. The purpose of the gaskets 194 is to serve as means to confine lubricant, which lubricant may be introduced through conventional lubrication fittings 195.

The previously mentioned aft operating rod 48 is operatively connected to the locking block 176 by means of a suitable linkage system to lift the locking block and thereby permit the jaw members 165 to fly open. As heretofore stated, however, a suitable latch means is provided to prevent such release operation unless the small piston 152 in the auxiliary cylinder 54 is actuated. This latching means comprises the previously mentioned bell crank pawl 52. For the purpose of mounting the required linkage system, a Y-shaped support plate 196 is mounted on the cylinder block 120 by suitable attachment means 198 at its lower end.

A suitable clevis 200 is threaded onto the end of the aft operating rod 48 to permit adjustment in the effective length of the operating rod and this clevis is pivotally connected by a pin 202 to the upper end of a lever 204 that comprises a pair of coextensive parallel straps. The lever 204 rocks on a fulcrum pin 205, one end of which is mounted in the Y-shaped support plate 196 and the other end of which is mounted in the side plate 191 of the previously mentioned U-shaped bracket. The lower end of the inclined lever 204 straddles the forward end of a rearwardly extending link 206 and is pivotally connected thereto by a pin 208.

The aft end of the rearwardly extending link 206 is connected by a pivot pin 210 to the lower arm 211 of a bell crank that is generally designated by numeral 212. The bell crank 212 has a second upper arm 214 which provides a forward latch shoulder 215 for engagement by the bell crank pawl 52 and further provides a concentrically curved edge 216 extending rearward from the latching shoulder. As best shown in Figure 10, the bell crank 212 may comprise two interconnected pieces of sheet metal journalled on a fulcrum pin 218, one of the pieces of sheet metal forming the lower arm 211 of the bell crank and the two pieces being offset against each other to form the upper arm 214. Thus the two thicknesses of sheet metal form the latching shoulder 215 as well as the concentrically curved edge 216.

The bell crank pawl 52 is fulcrumed on a pivot pin 220 that is anchored both in the Y-shaped support plate 196 and in the side plate 191 of the previously mentioned U-shaped bracket. The lower arm of the bell crank pawl 52 forms a latching finger 222 for engagement with the latch shoulder 215. Preferably the bell crank pawl 52 includes a pair of side plates 224 on opposite sides of the latching finger 222, which side plates slidingly straddle the curved edge 216 of the upper arm 214 of the bell crank 212 to assure continuous alignment of the bell crank pawl 52 therewith.

The bell crank 212 carries a laterally extending stud 225 which is positioned to move against and actuate an arm 228 in the form of a U-shaped strap. The lateral stud 225 may be aptly termed a lost-motion stud since it moves through a portion of its arc before it makes operative contact with the arm 228. The two legs of the U-shaped strap are pivotally mounted on trunnions 230 of the guide block 182, the trunnions 230 being at 90° from the previously mentioned guide block trunnions 185. A link 232 comprising a spaced pair of angular straps operatively connects the arm 228 to a rearward extension 234 of the locking block 176. As best shown in Figure 10, the upper ends of the two angular straps that comprise the link 232 are pivotally connected to the arm 228 by pivot pins 235 and the lower ends of the two angular straps are connected to the locking block extension 234 by means of a pivot pin 236.

Preferably suitable yielding means is provided to urge the locking block 176 downward to its normal position between the two locking arms 172 thereby to keep the two jaw members 165 in their closed positions. For this purpose a suitable stud 238 (Figures 10 and 12) may be mounted on the side plate 190 of the previously mentioned U-shaped bracket. A torsion spring 240 is mounted on this stud 238 with one end 242 of the spring anchored by abutting against block extension 243 (Figure 12) and the other spring end 244 pressing against the upper side of the arm 228 as best shown in Figure 13.

The normal positions of the parts of the linkage system that operatively connects the aft operating rod 48 with the locking block 176 are shown in Figures 9, 10 and 13. When the operating rod 48 is shifted longitudinally forward, it acts through the lever 204 and the link 206 to rock the bell crank 212 counterclockwise as viewed in Figure 9 and acting through the bell crank 212, the lateral time-delay stud 225, the arm 228 and the link 232, it lifts the locking block 176 upward from its normal position between the two locking arms 172 of the pair of jaw members 165. If the bell crank pawl 52 remains in its normal effective position shown in Figure 9, however, this release action is prohibited. If the bell crank pawl 52 is acted upon by the small piston 152 and is thereby rotated clockwise as viewed in Figure 9, the latching finger 222 is lifted out of engagement with the latching shoulder 215 of the bell crank 212 and the bell crank 212 is permitted to rotate counterclockwise to permit the parts of the linkage system to take the positions shown in Figure 14.

Figure 14:
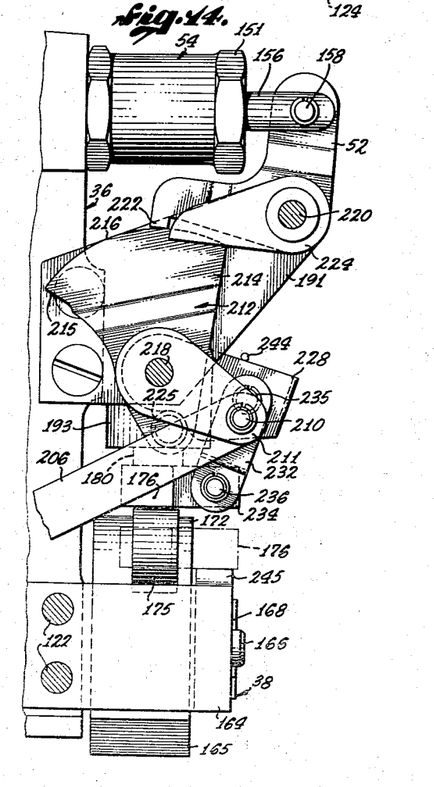
Figure 14 is a fragmentary side elevation of the aft ejector gun showing the release mechanism associated therewith in its released position.

In Figure 14, the locking block 176 has been raised clear of the rollers 175 on the two locking arms 172 and the previously mentioned coil spring 178 that interconnects the locking arms has rotated the two jaw members 165 to their release positions. If the two jaw members 165 are in engagement with a T-shaped shackle 162 of a store at the beginning of this release operation, the weight of the store cooperates with the force of the spring 178 to urge the jaw members to their open positions.

In preparation for the next flight, the open pair of jaw members 165 may be closed into engagement with a T-shaped shackle 162 of a new store simply by moving the shackle upward between the jaws against the pair of auxiliary fingers 174. The shackle member in moving against the fingers 174 rotates the two jaw members 165 to their open positions in opposition to the coil spring 178 and then by virtue of the torsion spring 240 the locking block 176 snaps downward to its normal position between the two locking arms 172 to keep the pair of jaw members in their closed positions. As shown in Figure 14, a lug 245 projecting upward from extension 164 forms a stop for the locking block 176.

*The construction of the forward ejector gun unit*

The forward ejector gun unit 32, which is illustrated by Figures 15 to 19 inclusive, comprises a cylinder block, generally designated by numeral 250, which forms the previously mentioned cylinder 58 together with a cylinder head 252. The cylinder block 250 is telescoped into a large vertical bore 254 of a yoke casting that is generally designated by numeral 255, the cylinder block having a circumferential flange 256 that rests on the upper side of the yoke casting. The yoke casting 255 incorporates the two previously mentioned forward jaw assemblies 34 and 35 and is suitably mounted on the two previously mentioned spaced support webs 124.

Figure 15:
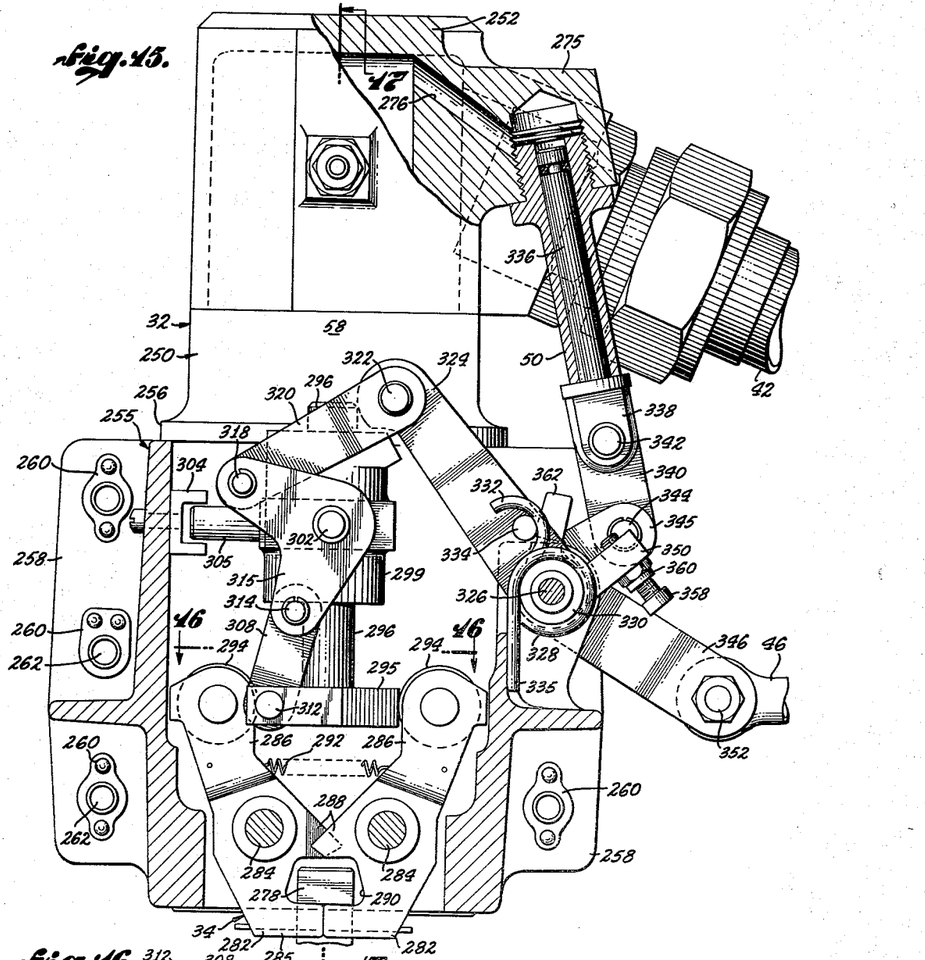
Figure 15 is a sectional view of the forward ejector gun taken as indicated by the line 15—15 of Figure 18 showing the store attachment means associated therewith, the store attachment means being shown in its effective position.
Figure 16:
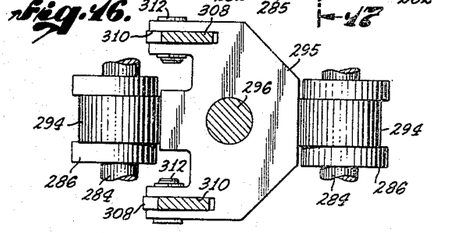
Figure 16 is a fragmentary transverse section taken as indicated by the line 16—16 of Figure 15 showing how a locking block cooperates with a pair of attachment jaws to hold the pair of jaws closed.

As best shown in Figures 15 and 18, the yoke casting 255 is formed with flanges 258 at its opposite ends which carry suitable anchor nuts 260 to receive screws 262 by means of which the yoke casting is securely attached to the support webs 124. The lower end of the cylinder 58 is closed by a bushing 264 which threads onto the cylinder and cooperates with the circumferential flange 256 of the cylinder block 250 to immobilize the cylinder block relative to the yoke casting 255. For this purpose, the cap 264 may be tightened against a suitable washer 265 at the underside of the yoke casting.

The previously mentioned piston 60 is provided with an O-ring 266 and is integral with a hollow piston rod 268 that extends normally through the bushing 264, the lower end of the piston rod being provided with split stop ring 138. Here again an O-ring 136 of rubber-like material may be positioned inside the bushing 264 to serve as a bumper or cushion for the piston 60.

The piston 60 reciprocates inside a liner sleeve 272 which is used whenever it is intended that the high pressure actuating fluid be generated by combustion, but this liner is removed when the actuating fluid is to be taken from a static high pressure reservoir. The cylinder head 252 has a lateral cylindrical extension 274 for connection to the previously mentioned forward pipe 42, and has a second lateral extension 275 that is bored and threaded to receive the previously mentioned auxiliary power cylinder 50. A bore 276 (Figure 17) places the auxiliary power cylinder 50 in communication with the interior of the cylinder head.

Figure 17:
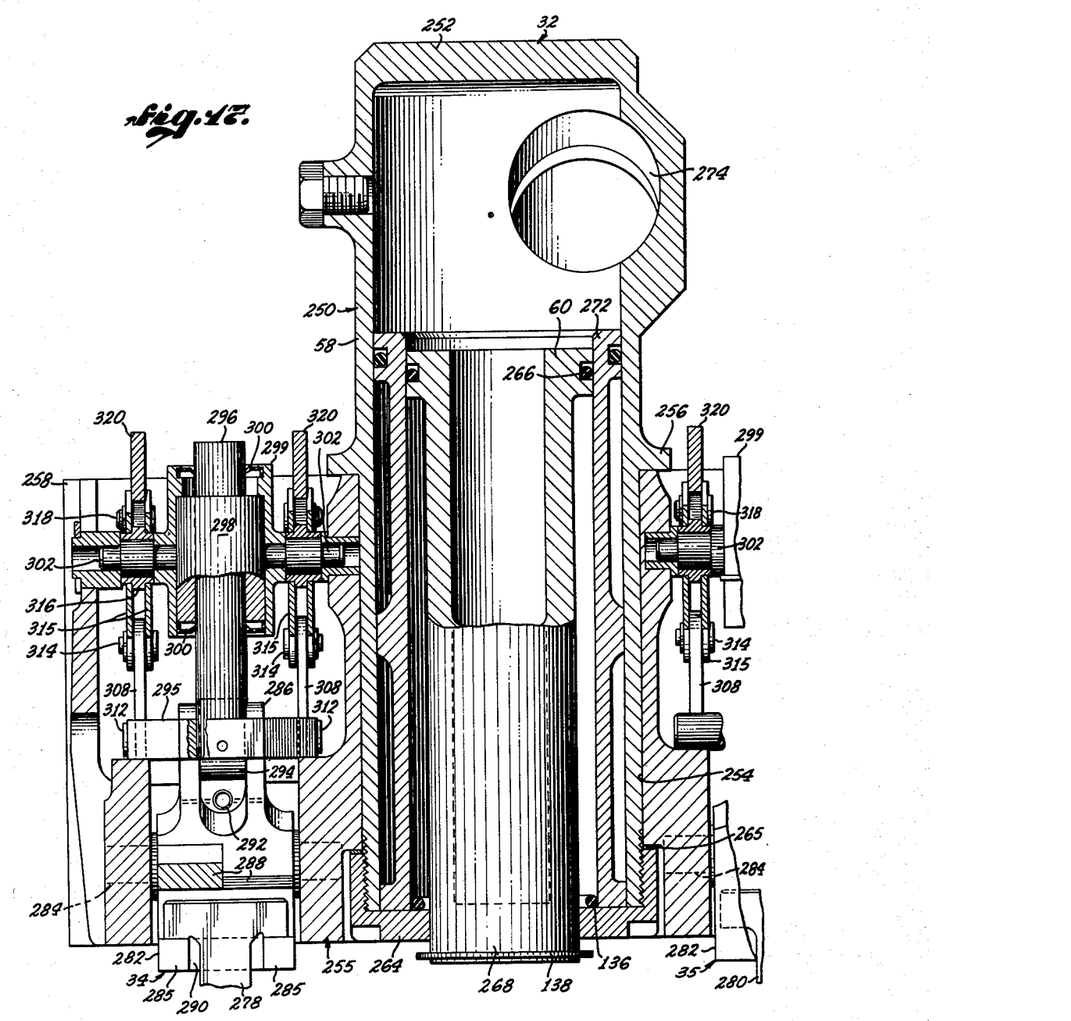
Figure 17 is a fragmentary sectional view taken as indicated by the line 17—17 of Figure 15.

The two jaw assemblies 34 and 35 are mounted in the opposite ends of the yoke casting 255 on opposite sides of the cylinder block 250 and are adapted for releasable engagement with corresponding T-shaped shackles 278 and 280 of the store 55 (Figure 17). The two jaw assemblies 34 and 35 are alike in construction and each has a pair of jaw members 282 of the character heretofore described mounted on a corresponding pair of pivots 284. Each of the jaw members 282 has a lower arm in the form of a hook-shaped jaw 285, an upper locking arm 286 and an auxiliary finger 288. Each of the hook-shaped jaws 285 is formed with a recess 290, as best shown in Figures 15 and 17, to permit the pair of jaw members to clear the shank of the corresponding T-shaped shackle and thus engage the underside of the shackle head. The upper locking arms 286 of the pair of jaw members are interconnected by the usual coil spring 292 and the locking arms carry the usual rollers 294.

In the manner heretofore described, a suitable locking block 295 is normally interposed between the two locking arms 286 in contact with the rollers 294 to lock the two jaw members 282 in their normal closed position as shown in Figure 15. The locking block 295 is mounted on the lower end of a shank 296 that slidingly extends through a corresponding guide block 298. The guide block 298, which may be a linear ball bushing, is preferably mounted in a casing 299 (Figure 17) which, in the manner heretofore described, is provided with upper and lower gaskets 300 for confining lubricant around the shank. Each guide block 298 is provided with trunnions 302 that are journalled in the yoke casting 255.

As best shown in Figure 15, a U-shaped stop means 304 cooperates with a lug 305 that extends radially from the guide block 298 to limit the range of rotation of the guide block about the axis of the two trunnions 302. Within this range of rotation, the guide block 298 is free to adjust itself without strain for cooperation of the locking block 295 with the locking arms 286.

Any suitable linkage system may be provided to lift the two locking blocks 295 of the two jaw assemblies 34 and 35 and additionally to actuate the forward operating rod 46. For this purpose, a pair of links 308 may extend into corresponding slots 310 (Figure 16) in each of the two locking blocks 295 and may be pivotally connected to the locking blocks by suitable pins 312. As best shown in Figures 15 and 17, the upper ends of each pair of links 308 are connected by pins 314 to a corresponding pair of bell cranks 315. Each bell crank 315 comprises two parallel identical pieces of sheet metal mounted on a hub member 316 (Figure 17) which hub member is journalled on an enlarged portion of a trunnion 302 of the guide block 298.

The upper arm of each of the bell cranks 315 is operatively connected by a pin 318 to the lower end of an inclined link 320. As best shown in Figure 18, the upper ends of each pair of inclined links 320 are interconnected by a cross pin 322 provided with spacer sleeves 323, which cross pin is pivotally engaged by a relatively long rocker arm 324. The rocker arm 324 of the jaw assembly 35 is keyed to a shaft 325 and the rocker arm 324 of the jaw assembly 34 is keyed to a second shaft 326 that is coaxial with the shaft 325 and is positioned in end to end relation thereto. These two coaxial shafts 325 and 326 are suitably journalled in the yoke casting 255 for rotation independent of each other.

It is contemplated that suitable spring means will be provided to bias each of the rocker arms 324 in a direction to urge the corresponding locking block 295 downward to its effective position shown in Figures 15 and 17. For this purpose, a torsion spring 328 may be provided on each of the two shafts 325 and 326, each torsion spring being wrapped around a sleeve 330 with one end 322 of the spring hooked around a lug 334 on the corresponding rocker arm 324 and the other spring end 335 suitably anchored to the yoke casting 255. As shown in Figure 15 the torsion springs 328 urge the corresponding rocker arms 324 to limit positions against the shanks 296 of the corresponding locking blocks 295.

It is contemplated that the two coaxial shafts 326 and 325 which control the release of the two corresponding jaw assemblies 34 and 35, respectively, will be operated by two corresponding lost-motion mechanisms in response to pressure rise in the auxiliary power cylinder 50, the two lost-motion mechanisms being adjustable to cause the two jaw assemblies to release synchronously with each other and also synchronously with respect to the release action of the aft jaw assembly 38. For this purpose a small piston 336 (Figure 15) in the auxiliary power cylinder 50 is formed with a clevis 338 at its outer end and this clevis is connected to one end of a small link 340 by a pivot pin 342. The second end of the link 340 is connected by a pivot pin 344 with a rocker arm 345 that comprises two spaced plate members, as may be seen in Figure 18.

The rocker arm 345 is unitary with a second rocker arm 346 of similar construction and is also integral with two actuating arms 348 and 350. This integral assembly, comprising the two rocker arms 345 and 346 and the two actuating arms 348 and 350, is journalled on the adjacent ends of the two coaxial shafts 325 and 326 adjacent a long spacer sleeve 251 on the shaft 325 for rotation independently of the two shafts. The rocker arm 346 is connected by a pivot bolt 352 to the previously mentioned forward operating rod 46 that is connected to the rotary valve 45.

The actuating arm 348 of the integral assembly carries an adjustable screw 354 equipped with a lock nut 355 and this screw is positioned to move against a cooperating arm 356 that is fixedly mounted on the previously mentioned shaft 325. Thus when the actuating arm 348 is operated by the small piston 336, it swings through an arc of lost-motion and then the screw 354 thereon contacts the arm 356 to rotate the shaft 325 and thereby cause release operation of the jaw assembly 35. In like manner an adjustable screw 358 that is provided with a lock nut 360 is threaded through the second actuating arm 350 to move against a cooperating arm 362 on the second shaft 326 for release operation of the jaw assembly 34. Each of the two arms 356 and 362 may be adjustably mounted on the corresponding shaft. In the construction shown, each of these two arms is provided with a set screw 364 (Figure 18) in releasable engagement with the corresponding shaft 325 or 326.

*Operation*

When the explosive material is detonated in the combustion chamber 40, generated gas flows through the open rotary valve 45 and through the pipes 42 and 44 to the two ejector guns 32 and 36 respectively. The rising fluid pressure in the forward ejector gun 32 acting on the relatively small piston 336 in the forward auxiliary cylinder 50 tends to actuate the linkage systems that control release operation of the three jaw assemblies 34, 35 and 38. The engagement of the bell crank pawl 52 of the aft ejector unit with the latch shoulder 215, however, initially prevents such actuation of the linkage systems. When the fluid pressure in the aft ejector gun 36 reaches a predetermined pressure determined by the spring 160 in the auxiliary cylinder 54, the piston 152 in the auxiliary cylinder causes release operation of the bell crank pawl 52 thereby to permit actuation of the two linkage systems.

During the initial movement of the small actuating piston 336 after the release operation of the bell crank pawl 52, the piston actuates the forward operating rod 46 by means of the link 340, the rocker arm 345 and the rocker arm 346. The consequent forward movement of the forward operating rod 46 rotates the rotary valve 45 counterclockwise as viewed in Figures 1 and 7 until the ports 78 and 80 in the valve member 76 move out of register with the ports 82 and 84 to cut off the two pipes 42 and 44 from each other as well as to cut off the two pipes from the combustion chamber. The provision for lost-motion in the linkage systems permits this valve closing operation to be carried out prior to the release operation of the three jaw assemblies 34, 35 and 38. Thus the valve reaches its closed position before the lateral lost-motion stud 225 in the aft linkage system makes operating contact with the cooperating arm 228 and before the adjustable screws 354 and 358 on the actuating arms 348 and 350 of the forward linkage system make operating contact with the two corresponding cooperating arms 356 and 362.

With continued rotation of the rotary valve 45, the port 78 of the valve member 76 reaches the vent port 85 (Figure 7) to permit the residual gases in the combustion chamber 45 to exhaust to the atmosphere. This continued rotation of the rotary valve occurs as the operations of the forward and aft linkage systems are completed for release operation of the jaw assemblies 34, 35 and 38.

Since the two bodies of gas for actuating the two ejector guns 32 and 36, respectively, are completely isolated before the jaw assemblies 34, 35 and 38 release the store or fuel tank 55, these gas bodies expand adiabatically with the ratio of the forces exerted by the two ejector guns constant throughout the stroke of the two ejector gun pistons 60 and 64. This ratio is selected to cause substantially pure translation of the store in its movement away from the aircraft, as heretofore explained.

A practical procedure for designing an embodiment of the invention is to select certain dimensions and values and then to calculate the remaining dimensions and values required for the desired dual translation of the store away from the aircraft. In the initial practice of the invention, for example, the following data were provided: length of piston stroke for both ejector guns 5 inches; diameter of the forward ejector gun piston 1.875 inches; peak force exerted by the forward gun 11,780 lbs.; the peak force exerted by the aft ejector gun 6,315 lbs.; the average force exerted by the forward ejector gun 9,456 lbs.; the average force exerted by the aft ejector gun 5,070 lbs.; the horizontal distance from the forward pair of laterally spaced T-shaped shackles to the aft T-shaped shackle 48.39 inches measured center to center; the weight of the store at the time of release 807 lbs.; and a distance of 16.369 inches from the forward pair of T-shaped shackles to the center of gravity of the store as measured horizontally.

On the basis of this data calculations are carried out to determine the diameter of the aft ejector gun piston 64 and the initial volumes of the two gas bodies required to maintain the required ratio between the two thrust forces throughout the five inch strokes of the two pistons. This ratio is the ratio between the two peak forces 11,780 lbs. and 6,315 lbs., the ratio being 1.865. As heretofore stated, this ratio between the two peak forces is based on the relative distances of the T-shaped shackles from the center of the store but the basic ratio between these distances is modified to compensate for the expected aerodynamic turning moment that is effective as soon as the jaw assemblies release the store.

For example, the basic ratio between the two peak forces may be 2.0, but the ratio between the two peak forces that would produce the same turning force as the aerodynamic moment may be 0.135. Thus, to compensate for the aerodynamic moment, the basic ratio 2.0 is reduced by 0.135, the final ratio that is actually used being 1.865. The procedure for calculating the turning moment exerted by the airstream on a body carried by an airplane in an exposed position is well-known, and it is a simple matter to find the equivalent ratio between the forces of the two ejector guns that would produce the same turning moment. Whether or not the equivalent ratio should be added to the basic ratio or subtracted depends, of course, on the direction of the aerodynamic moment.

The calculations take into account the initial temperature in the combustion chamber of 5,000° F. and also take into account the initial pressure in the combustion chamber of 4500 p.s.i., it being assumed that expansion occurs so rapidly that heat transfer is negligible. From the calculations using the modified ratio between the two peak forces to take into account the aerodynamic turning moment it is found that the diameter of the piston of the aft ejector gun should be 1.38 inches, the volume of the body of gas isolated for actuation of the aft ejector gun should be 18.7 cubic inches, and the volume of the isolated body of gas for actuating the forward ejector gun should be 35.0 cubic inches. These volumes are provided in part by dimensioning the head space provided by the cylinder head of each ejector gun, and, in part, by selecting the diameters of the two pipes 42 and 44 that extend from the rotary valve 45 to the two ejector guns respectively.

*Modification of the apparatus for actuation by a reservoir of compressed gas*

A feature of the described apparatus is that it may be readily converted from operation by explosive material to operation by compressed air stored at approximately 3000 p.s.i. To make such a conversion, the liner sleeve 126 is removed from the aft ejector gun to permit the use of a larger diametered piston therein and the liner sleeve 272 is removed from the forward ejector gun to permit the use of a piston of correspondingly larger diameter therein. Further alterations of the two ejector guns include: the substitution of an auxiliary power cylinder 50a (Figure 22) for the auxiliary power cylinder 50, the substitution of a small piston 336a for the small piston 336 of the forward ejector gun 32, and the substitution of an auxiliary power cylinder 54a (Figure 23) for the auxiliary power cylinder 54 of the aft ejector gun 36. The combustion chamber 40 is removed along with the rotary valve 45 and the two pipes 42 and 44. A single operating rod 370 (Figure 20) is substituted for the two operating rods 46 and 48, the single operating rod directly connecting the rocker arm 346 of the forward linkage system with the lever 204 of the aft linkage system.

A suitable tank 372 serves as a supply tank or reservoir to contain the required charge of compressed air at approximately 3000 p.s.i. Any suitable piping arrangement provided with suitable control means may be employed to place the compressed air reservoir 372 in communication with the two ejector gun units 32 and 36 for the purpose of the invention. For example, the arrangement shown in Figures 20 and 21 may be employed advantageously.

Figure 20:
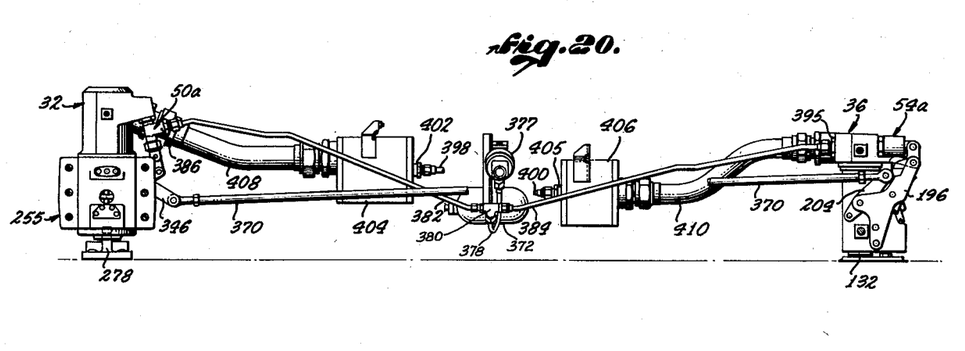
Figure 20 is a side elevation of a second form of the invention which employs a reservoir of compressed gaseous fluid to actuate the two ejector guns.
Figure 21:
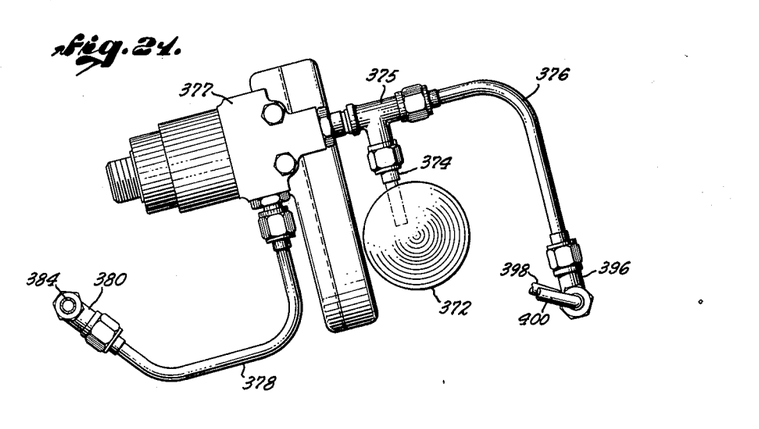
Figure 21 is a sectional view taken as indicated by the line 21—21 of Figure 20.

In this arrangement, the reservoir 372 has a discharge tube 374 which is connected by a T 375 both with a tube 376 and a solenoid valve 377. The solenoid valve controls flow to a tube 378 that is connected by a T 380 both with a branch tube 382 that leads to the auxiliary power cylinder 50a of the forward ejector gun unit 32 and a branch tube 384 that leads to the auxiliary power cylinder 54a of the aft ejector gun unit 36.

Figure 22:
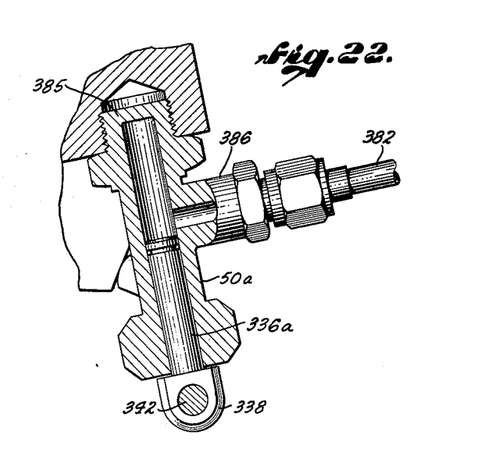
Figure 22 is a sectional view of a small auxiliary power cylinder in the arrangement shown in Figure 20.

As shown in Figure 22, the auxiliary power cylinder 50a is completely cut off from the interior of the cylinder head and cylinder of the forward ejector gun unit 32. Thus the auxiliary power cylinder 50a is closed at its inner end by an end wall 385 and is provided with a lateral tubular extension 386 for connection with the branch tube 382.

Figure 23:
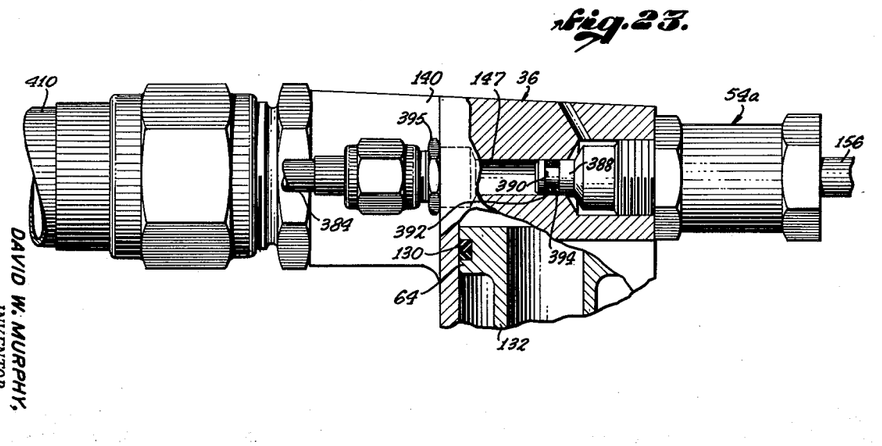
Figure 23 is a view, partly in plan and partly in cross section, showing the small auxiliary power cylinder for the aft ejector gun of Figure 20.

As shown in Figure 23, the auxiliary power cylinder 54a is also cut off from the interior of the corresponding cylinder head and cylinder of the aft ejector gun unit 36. Thus in the construction shown, the auxiliary power cylinder 54a has a reduced inner end or neck 388 that extends into the previously mentioned bore 147 in the cylinder head 125. The neck 388 is suitably sealed in the bore and for this purpose, may be provided with a circumferential groove 390 to receive an O-ring 392 together with a cooperating ring member 394. The previously mentioned plug 148 (Figure 12) at the outer end of the bore 147 is replaced by a fitting 395 for connection to the previously mentioned second branch tube 384.

The solenoid valve 377 is normally closed to cut off the auxiliary power cylinders 50a and 54a from the high pressure fluid in the reservoir 372. Preferably, a suitable vent to the atmosphere is provided to prevent build-up of pressure in the auxiliary power cylinders 50a and 54a in the event that leakage of the high pressure fluid should occur through the solenoid valve 377. For this purpose, the outlet side of the solenoid valve 377 may have a normally open vent port to the atmosphere that is closed when the solenoid valve is actuated, or the same purpose may be served by a small diameter vent bore, say a vent bore of $1/16$ inch diameter or less, anywhere between the solenoid valve and the two auxiliary power cylinders.

The previously mentioned tube 376 that is in constant communication with the reservoir 372 through the T 375 and the tube 374 is connected by a T 396 to a branch tube 398 and a second branch tube 400. The branch tube 398 is connected by an orifice fitting 402 with a plenum chamber 404, and the second branch tube 400 is connected by a similar orifice fitting 405 with a second plenum chamber 406. The first plenum chamber 404 is connected by a pipe 408 of relatively large diameter with the cylinder head of the forward ejector gun unit 32 and in like manner the second plenum chamber 406 is connected by a pipe 410 of relatively large diameter with the cylinder head of the aft ejector gun unit 36. The two orifice fittings 402 and 405 may, for example, provide orifices of $1/16$ inch diameter.

It is apparent from the foregoing that the high pressure fluid in the reservoir 372 is in constant direct communication with the cylinders of the two ejector guns through the orifice fittings 402 and 405 and that soon after the reservoir 372 is charged with compressed air, the same fluid pressure will exist in the main cylinders of the two ejector guns as exists in the reservoir 372. Thus the ejector gun pistons will constantly exert ejection force against the store.

When the solenoid valve 377 is opened by remote control, the compressed air flows through the tubes 382 and 384 to the auxiliary power cylinders 50a and 54a to cause the three jaw assemblies 34, 35 and 38 to open simultaneously for release of the store from the aircraft. As soon as the three jaw assemblies release the store, the two bodies of compressed air in the two ejector guns expand adiabatically in the manner heretofore described to cause pure translation of the store away from the aircraft. A feature of this practice of the invention is that the use of the relatively small orifices in the orifice fittings 402 and 405, makes it unnecessary to employ a rotary valve. The $1/16$ inch diametered orifices are large enough to permit the two ejector guns to be charged with the required bodies of compressed air but are small enough, in effect, to isolate the two bodies of compressed air from each other while they are expanding. Thus during the expansion of the two bodies of compressed air in the ejection operation, the flow through the two orifice fittings 402 and 405 is of negligible magnitude. It is apparent that the large-diametered two pipes 408 and 410 and the two corresponding plenum chambers 404 and 406 are dimensioned to give the two gaseous bodies the particular volumes required for maintaining the two ejection forces constant at the required ratio throughout the strokes of the pistons of the two ejector guns.

My description in specific detail of the selected practices of the invention will suggest various changes, substitutions and other departures from my disclosure that properly lie within the spirit and scope of the appended claims.

I claim:

1. In a mechanism on an airborne vehicle to carry a jettisonable store and eventually to eject the store with translation of the store away from the airborne vehicle, the combination of: attachment means to releasably attach the store to the airborne vehicle; means providing gaseous fluid under pressure; a first means having walls forming a space to receive said gaseous fluid to confine a first body of the gaseous fluid under pressure, said walls including a movable wall responsive to expansion of the body of fluid to apply a thrust stroke against said store at a first point of the store at a given distance in one direction from the center of gravity of the store; a second means having walls forming a space to receive said gaseous fluid to confine a second body of the gaseous fluid, said walls of the second means including a second movable wall responsive to expansion of the second body of fluid to apply a second thrust stroke against said store at a second point of the store at a greater distance than said given distance in the opposite direction from the center of gravity of the store; means to cut off rapid pressure communication between said two spaces after said bodies are confined therein; and means to release said attachment means thereby to permit said two bodies of fluid to expand simultaneously independently of each other for exerting ejection thrust against the store, the relative volumes of said two spaces and the rates of expansion thereof by movement of said movable walls being of magnitudes to maintain a given ratio between the two thrust forces throughout the said strokes, said ratio being in accord with said distances from the center of gravity to cause the thrusts to occur substantially synchronously for translation of the store.

2. A combination as set forth in claim 1 in which said ratio is the inverse ratio of said distances modified to compensate for an aerodynamic turning moment on the released store arising from the angle of attack of the released store.

3. A combination as set forth in claim 2 in which said movable walls are pistons, the volumes of the two spaces and the diameters of the two pistons being of magnitudes to maintain said given ratio between the two thrust forces.

4. In a mechanism on an airborne vehicle to carry a jettisonable store and eventually to eject the store with translation of the store away from the airborne vehicle, the combination of: attachment means to releasably attach the store to the airborne vehicle; a first means having walls forming a space to confine a first body of gaseous fluid under pressure, said walls including a movable wall responsive to expansion of the body of fluid to apply a thrust stroke against said store at a first point of the store at a given distance in one direction from the center of gravity of the store; a second means having walls forming a space to confine a second body of gaseous fluid under substantially the same pressure, said walls of the second means including a second movable wall responsive to expansion of the second body of fluid to apply a second thrust stroke against said store at a second point of the store at a greater distance than said given distance in the opposite direction from the center of gravity of the store; combustion means normally in communication with said two spaces to generate gas to form said two bodies; means responsive to the rise of pressure of the generated gas to substantially cut off pressure communication between said two spaces for substantial isolation of the two spaces from each other; and means responsive to the rise in pressure of the generated gas to release said attachment means after said bodies are isolated thereby to permit said two isolated bodies of fluid to expand simultaneously for exerting ejection thrusts against the store, the relative volumes of said two spaces and the rates of expansion thereof by movement of said movable walls being of magnitudes to maintain a given ratio between the two thrust forces throughout said strokes, said ratio being in accord with said distances from the center of gravity to cause the thrusts to occur substantially synchronously for translation of the store.

5. A combination as set forth in claim 4 which includes means responsive to rise in pressure of the generated gas to cut off both said spaces from said combustion means immediately after said bodies are formed to permit the two bodies to expand independently of each other.

6. A combination as set forth in claim 5 in which said release means is responsive with a time lag relative to the response of said cut-off means to the rise in pressure of the generated gas.

7. A combination as set forth in claim 4 which includes spring means to oppose operation of the release means thereby to delay the release operation until the pressure of the generated gas reaches a predetermined high magnitude.

8. A combination as set forth in claim 4 in which said release means is operative in response to the rise in fluid pressure in one of said two spaces; and which includes a latch means normally preventing operation of said release means, said latch means being responsive to the rise in fluid pressure in the other of said two spaces.

9. In a mechanism on an airborne vehicle to carry a jettisonable store and eventually to eject the store with translation of the store away from the airborne vehicle, the combination of: attachment means to releasably attach the store to the airborne vehicle; a first means having walls forming a space to confine a first body of gaseous fluid under pressure, said walls including a movable wall responsive to expansion of the body of fluid to apply a thrust stroke against said store at a first point of the store at a given distance in one direction from the center of gravity of the store; a second means having walls forming a space to confine a second body of gaseous fluid under substantially the same pressure, said walls of the second means including a second movable wall responsive to expansion of the second body of fluid to apply a second thrust stroke against said store at a second point of the store at a greater distance in the opposite direction from the center of gravity of the store; combustion means in communication with said two spaces to generate gas to form said two bodies; normally open valve means to cut off said first and second means from each other and from said combustion means; means to ignite material in said combustion means for the generation of high pressure gas; means responsive to the pressure of the generated gas to close said valve means with a time lag after the ignition of said material; and means responsive to the pressure of the generated gas to release said attachment means with a time lag after the ignition of the material.

10. A combination as set forth in claim 9 in which said valve-closing means and said release means are operatively interconnected.

11. A combination as set forth in claim 10 in which the interconnection between the valve-closing means and the release means provides lost motion for lag in the timing operation of the release means relative to the operation of the valve-closing means.

12. A combination as set forth in claim 9 in which said valve-closing means and said release means are responsive to the rise in pressure of the gas in one of said two spaces; and which includes a latch to prevent operation of said release means, said latch being responsive to the rise in gas pressure in the other of said two spaces.

13. In a mechanism on an airborne vehicle to carry a jettisonable store and eventually to eject the store with translation of the store away from the airborne vehicle, the combination of: attachment means to releasably attach the store to the airborne vehicle; a first means having walls forming a space to confine a first body of gaseous fluid under pressure, said walls including a movable wall responsive to expansion of the body of fluid to apply a thrust stroke against said store at a first point of the store at a given distance in one direction from the center of gravity of the store; a second means having walls forming a space to confine a second body of gaseous fluid, said walls of the second means including a second movable wall responsive to expansion of the second body of fluid to apply a second thrust stroke against said store at a second point of the store at a greater distance in the opposite direction from the center of gravity of the store; a reservoir containing high pressure gaseous fluid in continuous communication with both said spaces to maintain said bodies of gaseous fluid therein; means to restrict the communication of each of said spaces with said reservoir to substantially prevent pressure transmission from the reservoir to the two spaces during the time intervals of said thrust strokes; and means to release said attachment means thereby to permit said two bodies of fluid to expand simultaneously for exerting ejection thrust against the store, the relative volumes of said spaces and the rates of expansion thereof by movement of said movable walls being of magnitudes to maintain a given ratio between the two thrust forces throughout said strokes, said ratio being in accord with said distances from the center of gravity to cause the thrusts to occur substantially synchronously for translation of the store.

14. A combination as set forth in claim 13 which includes: fluid-pressure-actuated means to operate said release means; and means including a normally closed control valve connecting said reservoir to said fluid-pressure-actuated means, whereby opening said valve causes the store to be ejected.

15. A combination as set forth in claim 14 in which said valve is normally open to the atmosphere on its discharge side to prevent pressure accumulation between the valve and the fluid-pressure-actuated means when the valve is closed.

16. A combination as set forth in claim 13 in which said reservoir is in communication with each of said two spaces through corresponding small orifices which substantially cut off the two spaces from said reservoir while said bodies of gaseous fluid are expanding.

17. A combination as set forth in claim 13 in which said ratio is the inverse ratio of said distances modified to compensate for an aerodynamic turning moment on the store arising from the angle of attack of the released store.

References Cited in the file of this patent

UNITED STATES PATENTS

| | | |
|---|---|---|
| 2,216,848 | Loweke | Oct. 8, 1940 |
| 2,466,980 | Bronson | Apr. 12, 1949 |
| 2,699,908 | Fletcher | Jan. 18, 1955 |
| 2,726,576 | Musser | Dec. 13, 1955 |
| 2,736,522 | Wilson | Feb. 28, 1956 |
| 2,822,207 | Stienmetz et al. | Feb. 4, 1958 |
| 2,889,746 | Glassman et al. | June 9, 1959 |